United States Patent Office 3,637,671
Patented Jan. 25, 1972

3,637,671
17β-TETRAHYDROPYRANYL ETHERS OF THE 19-NOR-Δ⁴ AND Δ⁵⁽¹⁰⁾-ANDROSTENES
Alexander D. Cross, Mexico City, Mexico, assignor to Syntex Corporation, Panama, Panama
No Drawing. Filed Mar. 30, 1966, Ser. No. 538,537
Int. Cl. C07c 173/00
U.S. Cl. 260—239.55     10 Claims

ABSTRACT OF THE DISCLOSURE

Novel 17β-tetrahydropyranyl ethers of the 19-nor-Δ⁴-androstene series and Δ⁵⁽¹⁰⁾-androstene series substituted at C–17 with a lower alkenyl or lower alkynyl group useful in fertility control.

---

This is a continuation-in-part of U.S. application Ser. No. 382,396, filed July 13, 1964, now abandoned.

This invention relates to novel 17β-tetrahydropyranyl ethers of the following formulas:

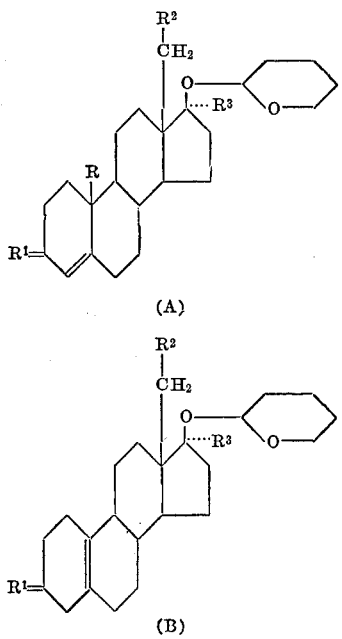

wherein R represents hydrogen or methyl, R¹ represents oxo or the group

wherein R⁴ is hydrogen or a hydrocarbon carboxylic acyl group containing less than 12 carbon atoms, R² represents hydrogen or a lower alkyl group containing 1 to 3 carbon atoms such as methyl, ethyl or propyl, and R³ represents a lower alkenyl group such as vinyl, prop-1-enyl, but-1-enyl, but-2-enyl, and the like, or a lower alkynyl group such as ethynyl, prop-1-ynyl, and the like.

The carboxylic acyl groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The novel 17β-tetrahydropyranyl ethers of the present invention exhibit a high degree of progestational activity when administered orally, and are useful in fertility control, for which purpose they can also be administered orally either alone or together with an estrogen such as estradiol, or the like. The compounds of the present invention also demonstrate pituitary inhibition activity and are useful in the control of ovulation and treatment of menstrual disorders. The novel compounds possessing a 17α-alkenyl group, particularly the 17α-vinyl group, also demonstrate anabolic activity and may be administered orally.

The compounds of the present invention can be obtained by etherification of the corresponding 17β-hydroxy compound with dihydropyran. Thus, the free 17β-hydroxyl-containing compound can be reacted under anhydrous conditions, with an excess of dihydropyran in the presence of an acid catalyst, e.g. p-toluene-sulfonic acid, boron trifluoride etherate, and the like, either alone or together with an inert organic solvent, such as benzene, diethyl ether, or the like, at a temperature of from about 0° C. to about 50° C. and preferably at room temperature (about 25° C.), for from about 2 hours to 72 hours or more.

Altenrative methods of obtaining the compounds of the present invention may be outlined as follows.

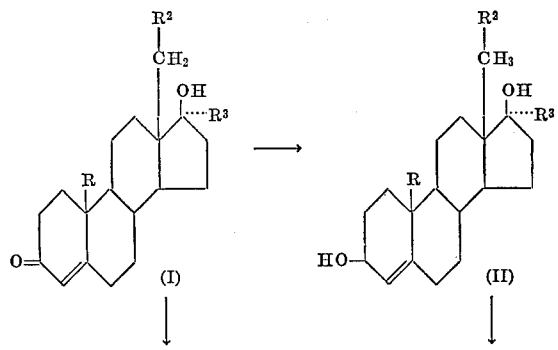

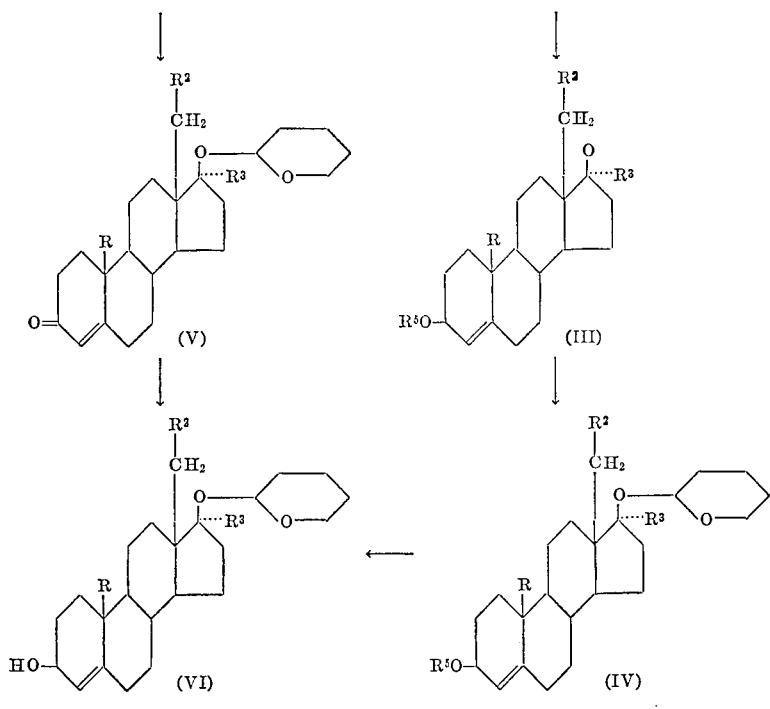

In the above formulas, R R² and R³ are as previously defined hereinabove and R⁵ represents a carboxylic acyl group containing less than 12 carbon atoms.

In practicing the above-outlined process involving the reaction sequence of (I→V→VI), a 3-keto-17β-hydroxy compound of Formula I is converted into the corresponding 17β-tetrahydropyranyl ether (V) by treatment with dihydropyran in the presence of an acid catalyst as described hereinabove. The thus-obtained 3-keto-17β-tetrahydropyranyl ether is transformed into the corresponding 3β-hydroxy compound (VI) by treatment with a reducing agent such as sodium borohydride, lithium tri-t-butoxy aluminum hydride, lithium aluminum hydride, and the like, in an inert solvent such as diethyl ether, tetrahydrofuran, hexane, and the like.

In practicing the above-outlined process involving the reaction sequence of (I→II→III→IV→VI), the 3-keto-17β-hydroxy compound (I) is reduced to the corresponding 3β,17β-diol compound (II) by one of the methods described in the preceding paragraph. The 3β,17β-diol compound is then selectively esterified at position 3 by treatment with a carboxylic acid anhydride containing less than 12 carbon atoms, for example, acetic, propionic, butyric, or the like, preferably acetic anhydride or with a carboxylic acyl halide containing less than 12 carbon atoms, for example, benzoyl chloride, and the like. The reaction may be carried out in pyridine, collidine, lutidine, or the like solvent at a temperature ranging from room temperature to the reflux temperature for from about 30 minutes to about 15 hours or more. The 3β-acyloxy-17β-hydroxy compound (III) is then treated with dihydropyran in the presence of an acid catalyst to obtain the corresponding 17β-tetrahydropyranyl ether (IV). If desired, the 3-ester may then be hydrolyzed by treatment with a base in an organic solvent e.g. methanol, and the like, to obtain the corresponding 3β-hydroxy compound (VI).

For the sake of simplicity only, the above-outlined processes are directed to compounds of Formula A i.e., the Δ⁴ compounds; however, the above-outlined processes may also be used for preparation of the novel compounds of Formula B, i.e., the Δ⁵⁽¹⁰⁾-compounds.

The following detailed examples are set forth to illustrate the present invention, but not as a limitation thereof.

PREPARATION A

A mixture of 28 g. of 3β,20β-dihydroxypregn-5-en-18-oic acid 18,20-lactone-3-acetate and 700 ml. of toluene was heated under reflux with 3 N-methylmagnesium chloride in 400 ml. of tetrahydrofuran for 4 days. The reaction mixture was cooled, poured onto ice, diluted with water and extracted with ethyl acetate. The organic layer was then washed with water, dried and evaporated furnishing 3β,20β-dihydroxy-18-methylpregn-5 - en - 18 - one which may be crystallized from acetone:hexane.

A solution of 12.2 g. of 3β,20β-dihydroxy-18-methylpregn-5-en-18-one in 400 ml. of triethylene glycol was heated under reflux at 145° C. with 80 ml. of 80% hydrazine hydrate and 25 g. of hydrazine dihydrochloride for 5 hours. The mixture was then allowed to cool and thereafter poured into water. The mixture was then extracted with ethyl acetate and the organic layer washed with water, dried and evaporated to dryness furnishing the corresponding 18-hydrazone derivative which may be crystallized from ethyl acetate:hexane.

A solution of 20 ml. of hydrazine hydrate in 200 ml. of diethylene glycol was distilled, under nitrogen, until the internal temperature reached 225° C. Ten grams of potassium hydroxide was then added cautiously and distillation continued, under nitrogen, until the temperature again reached 225° C. A solution of 15 g. of the above-prepared 18-hydrazone in 150 ml. of diethylene glycol was then added slowly while maintaining the temperature of the reaction mixture at reflux at 225° C. The resulting solution was heated under reflux in a nitrogen atmosphere for 5 hours, cooled, diluted with water and the precipitate which formed collected by filtration, washed with water and dried under vacuum giving 18-methylpregn-5-ene-3β,20β-diol which may be crystallized from methanol.

A solution of 2.2 g. of 18-methylpregn-5-ene-3β-20β-diol in 50 ml. of toluene and 8 ml. of cyclohexanone was boiled until 10 ml. of distillate was collected. Three milliliters of cyclohexanone and 2 g. of aluminum isopropoxide were then added and the mixture heated at reflux for 15 min., cooled, and poured into 150 ml. of water containing 5 ml. of acetic acid. The mixture was steam-distilled to remove solvents and the resulting emulsion extracted 3 times with 150 ml. portions of ether. The organic layer was washed with water, 2 N-hydrochloric acid and saturated sodium bicarbonate solution, dried and evaporated. The residue was dissolved in hexane:benzene (2:1) and adsorbed on alumina. Elution with benzene furnished 18-methylprogesterone.

A mixture of 1 g. of 18-methylprogesterone, 10 ml. of dioxane, 1 ml. of ethyl orthoformate, and 50 mg. of p-toluene-sulfonic acid in the presence of Drierite, at 25° C., was stirred for 2.5 hours. The mixture was poured into aqueous potassium bicarbonate and extracted with ether. The ether extract was dried over sodium sulfate and evaporated in the presence of a trace of pyridine. The resulting residue was dissolved in hexane:benzene (4:1) and filtered through alumina furnishing 3-ethoxy-18-methylpregna-3,5-dien-20-one which may be crystallized from methanol containing a trace of pyridine.

A solution of 500 mg. of the thus-prepared enol-ether in 5 ml. of tetrahydrofuran was added to 15 ml. of 1 N-potassium t-butoxide in t-butanol and the resulting solution shaken at 0° C. under an atmosphere of oxygen. The uptake of oxygen ceased at 35 ml. after 15 minutes. The solution was then neutralized to pH-7 by 1 N-acetic acid, extracted with ethyl acetate and the organic layer washed with water, dried and evaporated to dryness at 30° C. The residue was crystallized from acetone:water yielding 17α-hydroperoxy-3-ethoxy-18-methylpregna-3,5-dien-20-one.

A mixture of 3.1 g. of the thus obtained 17α-hydroperoxide in 100 ml. of acetic acid was stirred with 6 g. of zinc dust at 25° C. for 12 hours. The mixture was then filtered and the residue washed with ether. The filtrate was diluted with ether and the organic layer washed with water and sodium bicarbonate solution, dried and evaporated to dryness. Purification of the residue by means of preparative thin layer chromatography on H.F. silica gel with chloroform:methanol (9:1) afforded 17α-hydroxy-18-methylprogesterone which may be crystallized from acetone:hexane.

By using ethylmagnesium chloride or n-propylmagnesium chloride in place of methylmagnesium chloride, and repeating the procedure of this example, the corresponding 18-ethyl and 18-n-propyl derivatives, i.e. 17α-hydroxy-18-ethylprogesterone and 17α-hydroxy-18-n-propylprogesterone, respectively, were obtained.

PREPARATION B

A solution of 4.0 g. of 17α-hydroxy-18-methylprogesterone in 200 ml. of dry tetrahydrofuran was stirred with 20 g. of lithium tri-t-butoxyaluminum hydride at 0° C. for 7 hours and then at 25° C. for 15 hours. Water was added and the mixture concentrated to a small volume under vacuum. The residue was extracted with ethyl acetate and the organic layer washed with water and saturated sodium bicarbonate solution, dried and evaporated to dryness. This product in 200 ml. of acetic acid was reacted with 12 g. of lead tetra-acetate at 25° C. with stirring for 1.3 hours. About 20 ml. of ethylene glycol was then added to destroy the excess of oxidant and the resulting solution diluted with water and extracted with ethyl acetate. The organic layer was then washed with water and saturated sodium bicarbonate solution, dried and evaporated to dryness. The resulting residue was dissolved in hexane:benzene (1:1), adsorbed on alumina and eluted with benzene:ether (19:1) furnishing 3β-hydroxy-18-methyl-androst-4-en-17-one which may be crystallized from acetone:hexane.

By use of the foregoing procedure employing 17α-hydroxy-18-ethylprogesterone and 17α-hydroxy-18-n-propylprogesterone as the starting material, there was obtained 3β-hydroxy-18-ethylandrost-4-en-17-one and 3β-hydroxy-18-n-propylandrost-4-en-17-one, respectively.

PREPARATION C

A solution of 5 g. of 3β-hydroxy-18-methylandrost-4-en-17-one in 250 ml. of thiophene-free benzene was treated with 10 molar equivalents of vinylmagnesium bromide in anhydrous ether. The mixture was heated at reflux under anhydrous conditions for 24 hours, cooled, and cautiously treated with excess aqueous ammonium chloride solution. The resulting mixture was then extracted with ethyl acetate, the extracts washed with water, dried over sodium sulfate, and evaporated to dryness furnishing 17α-vinyl-18-methylandrost - 4 - ene-3β,17β-diol which may be purified by crystallization from methylene chloride:hexane.

By repeating the foregoing procedure using other alkenylmagnesium bromides in lieu of vinylmagnesium bromide, the corresponding 17α-alkenyl derivative was obtained, e.g. 17α-isopropenyl - 18 - methylandrost-4-ene-3β, 17β-diol, 17α-(1'-propenyl) - 18-methylandrost-4-ene-3β, 17β-diol, etc.

Similarly, through the use of 3β-hydroxy-18-ethylandrost-4-en-17-one and 3β - hydroxy-18-n-propylandrost-4-en-17-one and 3β-hydroxy-18-n-propylandrost-4-en-17-one in lieu of 3β-hydroxy-18-methylandrost-4-en-17-one, the corresponding 17α-alkenyl, 3β,17β-diol derivatives were obtained.

The Grignard reagent employed in the foregoing procedure are prepared via conventional procedures from magnesium and the appropriate olefinic halide. Thus, one method of preparing the Grignard reagents is as follows.

To a mixture of 8.0 g. of magnesium shavings and 100 ml. of dry ether cooled in an ice-bath, there was added, with stirring, 24 g. of 1-bromopropene in 40 ml. of dry ether in a dropwise manner. After addition was completed, the mixture was refluxed for one hour furnishing 1-propenylmagnesium bromide.

In a similar fashion, by use of the appropriate olefinic bromide, i.e., vinyl bromide, 2-bromopropene, and the like, in the foregoing process, there was obtained vinylmagnesium bromide, isopropenylmagnesium bromide, etc.

PREPARATION D

A solution of 980 mg. of 3β-hydroxy-18-methylandrost-4-en-17-one in 5 ml. of dichloromethane and 20 ml. of ether was added to a solution of potassium acetylide (from 390 mg. of potassium metal) in 100 ml. of liquid ammonia. The mixture was stirred for 6 hours, 800 mg. of ammonium chloride was added, and the ammonia allowed to evaporate overnight. The residue was extracted with dichloromethane and water and the organic layer washed with water, dried over sodium sulfate, and evaporated. The residue was absorbed on alumina (100 g.) and elution with benzene:ether (4:1 and 1:1) afforded a mixture of 17α - ethynyl-18-methylandrost-4-ene-3β,17β-diol and the unchanged 17-keto starting material from which the desired 17α-ethynyl product was isolated by crystallization from acetone:hexane.

By using 3β-hydroxy-18-ethylandrost-4-en-17-one or 3β-hydroxy-18-n-propylandrost-4-en-17-one as the starting material in the above procedure, the corresponding 17α-ethynyl-3β,17β-diol was obtained.

Similarly, by using potassium methylacetylide, and the like, in lieu of potassium acetylide in the above procedure, the corresponding 17α-alkynyl derivatives were obtained, e.g. 17α-(1'-propynyl) - 18 - methylandrost-4-ene-3β,17β-diol, etc.

PREPARATION E

A mixture of 1 g. of 17α-ethynyl-18-methylandrost-4-ene-3β,17β-diol in 20 ml. of dioxane, and 1.1 molar equivalents of 2,3-dichloro-5,6-dicyano-1,4-benzoquinone was stirred at 25° C. for 5.5 hours. The reaction mixture was filtered and the filtrate evaporated to dryness. The residue was dissolved in methylene chloride and filtered through 20 g. of alumina yielding 17α-ethynyl-17β-hydroxy-18-methylandrost-4-en-3-one which may be purified by recrystallization from acetone:hexane.

By repeating the foregoing procedure using other 17α-alkynyl-3β,17β-diol and 17α-alkenyl - 3β,17β - diol compounds as the starting material, the corresponding 17α- alkynyl-17β-hydroxy-3-one and 17α-alkenyl-17β-hydroxy-3-one derivatives were obtained, e.g. 17α-ethynyl-17β-hydroxy-18-ethylandrost-4-en-3-one, 17α-vinyl-17β-hydroxy-18-methylandrost-4-en-3-one, etc.

PREPARATION F

A solution of 1 g. of 17α-ethynyl-17β-hydroxy-18-methylestr-5(10)-en-3-one in 40 ml. of pyridine was hydrogenated at 25° C. atmospheric pressure in the presence of 0.4 g. of prehydrogenated 2% palladium-on-calcium carbonate. When 1.1 molar equivalents of hydrogen was adsorbed, the reaction was stopped. The catalyst was removed by filtration through Celite diatomaceous earth and washed with ethyl acetate and the combined filtrate and washings were evaporated to dryness under reduced pressure. The residue was dissolved in ethyl acetate and this solution then washed with water several times, dried and evaporated to dryness furnishings 17α-vinyl-17β-18-methylestr - 5(10) - en - 3 - one which may be further purified through recrystallization from acetone.

By use of this process, other 17α-alkynyl compounds were transformed into the corresponding 17α-alkenyl derivative, e.g. 17α-(1'-propenyl)-17β-hydroxy-18-methylestr-5(10)-en-3-one, 17α - vinyl-17β-hydroxy-18-n-propylestr-5(10)-en-3-one, etc.

EXAMPLE 1

Two milliliters of dihydropyran were added to a solution of 1 g. of 17α-vinyl-17β-hydroxyestr-4-en-3-one in 15 ml. of benzene. About 1 ml. was removed by distillation to remove moisture and 0.4 g. of p-toluenesulfonic acid was added to the cooled solution. This mixture was allowed to stand at room temperature for four days, and then washed with aqueous sodium carbonate solution and water, dried and evaporated. The residue was chromatographed on neutral alumina, eluted with hexane, furnishing 17α-vinyl-17β-(tetrahydropyran-2'-yloxy)-estr-4-en-3-one which was recrystallized from pentane.

By repeating the process of this example using

17α-vinyl-17β-hydroxy-18-methylandrost-4-en-3-one,
17α-ethynyl-17β-hydroxyestr-4-en-3-one,
17α-ethynyl-17β-hydroxyandrost-4-en-3-one,
17α-vinyl-17β-hydroxyestr-5(10)-en-3-one,
17α-ethynyl-17β-hydroxy-18-methylestr-5(10)-en-3-one,
17α-ethynyl-17β-hydroxy-18-methylandrost-4-en-3-one or
17α-ethynyl-17β-hydroxy-18-methylestr-4-en-3-one in lieu of 17α-vinyl-17β-hydroxyestr-4-en-3-one, there were obtained the corresponding 17β-(tetrahydropyran-2'-yl)-ethers, i.e.

17α-vinyl-17β-(tetrahydropyran-2'yloxy)-18-methylandrost-4-en-3-one,
17α-ethynyl-17β-(tetrahydropyran-2'-yloxy)-estr-4-en-3-one,
17α-ethynyl-17β-(tetrahydropyran-2'-yloxy)-androst-4-en-3-one,
17α-vinyl-17β-(tetrahydropyran-2'-yloxy)-estr-5(10)-en-3-one,
17α-ethynyl-17β-(tetrahydropyran-2'-yloxy)-18-methylestr-5(10)-en-3-one,
17α-ethynyl-17β-(tetrahydropyran-2'-yloxy)-18-methylandrost-4-en-3-one and
17α-ethynyl-17β-(tetrahydropyran-2'-yloxy)-18-methylestr-4-en-3-one, respectively.

EXAMPLE 2

One gram of lithium tri-t-butoxyaluminum hydride was added to an ice-cooled solution of 1 g. of 17α-ethynyl-17β-hydroxyestr-4-en-3-one in 120 ml. of tetrahydrofuran and the mixture was then allowed to stand for 16 hours at room temperature. The excess reagent was decomposed by addition of water and the solution was then concentrated to small volume in vacuo and diluted with water. The product was extracted with ethyl acetate and these extracts were washed with water, dried and evaporated giving 17α-ethynylestr-4-ene-3β,17β-diol which may be further purified by recrystallization from acetone:hexane.

In a like manner, by subjecting

17α-vinyl-17β-hydroxyestr-4-en-3-one,
17α-ethynyl-17β-hydroxy-18-methylestr-4-en-3-one,
17α-ethynyl-17β-hydroxyandrost-4-en-3-one,
17α-ethynyl-17β-hydroxy-18-methylandrost-4-en-3-one,
17α-vinyl-17β-hydroxyandrost-4-en-3-one,
17α-vinyl-17β-hydroxy-18-methylestr-4-en-3-one and
17α-vinyl-17β-hydroxy-18-methylandrost-4-en-3one to the process of this example, there was obtained 17α-vinylestr-4-ene-3β,17β-diol,
17α-ethynyl-18-methylestr-4-ene-3β,17β-diol,
17α-ethynylandrost-4-ene-3β,17β-diol,
17α-ethynyl-18-methylandrost-4-ene-3β,17β-diol,
17α-vinylandrost-4-ene-3β,17β-diol,
17α-vinyl-18-methylestr-4-ene-3β,17β-diol and
17α-vinyl-18-methylandrost-4-ene-3β,17β-diol, respectively.

EXAMPLE 3

A solution of 1 g. of sodium borohydride in 3 ml. of water was added to a solution of 1 g. of 17α-ethynyl-17β-hydroxy-18-methylestr-5(10)-en-3-one in 120 ml. of methanol at 0° C. and the mixture was then allowed to stand for 15 minutes. The excess reagent was decomposed by the addition of acetic acid and the solution was then concentrated to small volume in vacuo and diluted with water. The product was extracted with ethyl acetate and these extracts were washed with water, dried and evaporated giving 17α-ethynyl-18-methylestr-5(10)-en-3β,17β-diol.

By repeating the foregoing procedure,

17α-vinyl-17β-hydroxyestr-5(10)-en-3-one,
17α-ethynyl-17β-hydroxyestr-5(10)-en-3-one and
17α-vinyl-17β-hydroxy-18-methylestr-5(10)-en-3-one were converted into 17α-vinylestr-5(10)-ene-3β,17β-diol,
17α-ethynylestr-5(10)-ene-3β,17β-diol, and
17α-vinyl-17β-hydroxy-18-methylestr-5(10)-ene-3β,17β-diol respectively.

EXAMPLE 4

A mixture of 1 g. of 17α-ethynylestr-4-ene-3β,17β-diol, 2 ml. of acetic anhydride and 4 ml. of pyridine was allowed to stand at room temperature for 30 minutes. The mixture was then poured into ice-water and the solid which formed collected by filtration, washed with water, and dried giving 3β-acetoxy-17α-ethynylestr-4-en-17β-ol which may be further purified through recrystallization from acetone:hexane.

By use of the above process,

17α-vinylestr-4-ene-3β,17β-diol,
17α-ethynyl-18-methylestr-4-ene-3β,17β-diol,
17α-vinyl-18-methylestr-4-ene-3β,17β-diol,
17α-vinyl-18-methylandrost-4-ene-3β,17β-diol,
17α-vinylandrost-4-ene-3β,17β-diol,
17α-ethynylandrost-4-ene-3β,17β-diol,
17α-ethynyl-18-ethylandrost-4-ene-3β,17β-diol,
17α-vinylestr-5(10)-ene-3β,17β-diol, and
17α-ethynylestr-5(10)-ene-3β,17β-diol were converted into the corresponding 3β-acetoxy derivatives.

Similarly, through the use of other carboxylic anhydrides in the above process, other 3β-acyloxy derivatives may be obtained, e.g. the 3β-propionate derivatives.

EXAMPLE 5

Two milliliters of dihydropyran were added to a solution of 1 g. of 3β-acetoxy-17α-ethynylestr-4-en-17β-ol in 15 ml. of benzene. About 1 ml. was removed by distillation to remove moisture and 0.4 g. of p-toluenesulfonic acid was added to the cooled solution. This mixture was allowed to stand at room temperature for 4 days, and was then washed with aqueous sodium carbonate solution and water, dried and evaporated. The residue was chromatographed on neutral alumina, eluted with hexane, furnishing 3β-acetoxy-17α-ethynyl - 17β - (tetrahydropyran-2'-yloxy)-estr-4-ene which was recrystallized from pentane.

Likewise by subjecting

3β-acetoxy-17α-vinylestr-4-en-17β-ol,
3β-acetoxy-17α-ethynyl-18-methylestr-4-en-17β-ol,
3β-acetoxy-17α-vinylandrost-4-en-17β-ol,
3β-acetoxy-17α-ethynylandrost-4-en-17β-ol,
3β-acetoxy-17α-ethynyl-18-methylandrost-4-en-17β-ol,
3β-acetoxy-17α-vinyl-18-methylandrost-4-en-17β-ol,
3β-acetoxy-17α-vinylestr-5(10)-en-17β-ol,
3β-acetoxy-17α-ethynylestr-5(10)-en-17β-ol,
3β-acetoxy-17α-ethynyl-18-methylestr-5(10)-en-17β-ol or
3β-acetoxy-17α-vinyl-18-methylestr-5(10)-en-17β-ol to the process of this example, the corresponding 17β-(tetrahydropyran-2'-yl) ethers were obtained, i.e. 3β-acetoxy - 17α - vinyl-17β-(tetrahydropyran-2'-yloxy)-estr-4-ene, etc.

EXAMPLE 6

A suspension of 1 g. of 3β-acetoxy-17α-ethynyl-17β-(tetrahydropyran-2'-yloxy)-estr-4-ene in 60 ml. of methanol was treated with a solution of 1 g. of potassium carbonate in 6 ml. of water. The mixture was heated at reflux for one hour, cooled in ice and diluted with water. The solid which formed was collected by filtration, washed with water and dried giving 17α-ethynyl-17β-(tetrahydropyran-2'-yloxy)-estr-4-en-3β-ol which may be further purified by recrystallization from acetone:hexane.

Likewise, by subjecting the other 3β-acetoxy compounds of the present invention to the process of this example, the corresponding 3β-hydroxy derivatives were obtained, e.g.

17α-vinyl-17β-(tetrahydropyran-2'-yloxy)-estr-4-en-3β-ol,
17α-ethynyl-17β-(tetrahydropyran-2'-yloxy)-androst-4-en-3β-ol,
17α-vinyl-17β-(tetrahydropyran-2'-yloxy)-androst-4-en-3β-ol, etc.

EXAMPLE 7

A mixture of 2 g. of 17α-ethynyl-17β-(tetrahydropyran-2'-yloxy)-estr-4-en-3β-ol in 8 ml. of pyridine and 4 ml. of benzoyl chloride was heated at steam bath temperature for one hour. The mixture was then poured into ice water and the solid which formed collected by filtration, washed with water and dried furnishing 3β-benzoyloxy-17α-ethynyl-17β-(tetrahydropyran-2'-yloxy)-estr-4-ene which may be further purified through recrystallization from methylene chloride:hexane.

Use of the process of this example with other 3β-hydroxy compounds of the present invention provided the corresponding 3β-benzoyloxy derivatives.

EXAMPLE 8

A solution of 6 g. of 17α-ethynyl-17β-(tetrahydropyran-2'-yloxy)-estr-4-en-3β-ol in 120 ml. of pyridine was added to a mixture of 6 g. of chromic trioxide in 20 ml. of pyridine. The reaction mixture was allowed to stand at room temperature for 15 hours, diluted with ethyl acetate and filtrated through Celite diatomaceous earth. The filtrate was washed well with water, dried and evaporated to dryness furnishing 17α-ethynyl-17β-(tetrahydropyran-2'-yloxy)-estr-4-en-3-one which may be further purified by recrystallization from acetone: hexane.

By use of the above process, the other 3β-hydroxy compounds of the present invention were transformed into the corresponding 3-keto derivatives, e.g.

17α-vinyl-17β-(tetrahydropyran-2'-yloxy)-estr-5(10)-en-3-one,
17α-vinyl-17β-(tetrahydropyran-2₂-yloxy)-estr-4-en-3-one,
17α-ethynyl-17β-(tetrahydropyran-2'-yloxy)-18-methylandrost-4-en-3-one, etc.

EXAMPLE 9

By repeating the procedure of Example 3,
17α-vinyl-17β-(tetrahydropyran-2'-yloxy)-estr-5(10)-en-3-one,
17α-vinyl-17β-(tetrahydropyran-2'-yloxy)-18-methylestr-5(10)-en-3-one,
17α-ethynyl-17β-(tetrahydropyran-2'-yloxy)-18-methylestr-5(10)-en-3-one, and
17α-ethynyl-17β-(tetrahydropyran-2'-yloxy)-estr-5(10)-en-3-one were converted into the corresponding 3β-hydroxy derivatives.

EXAMPLE 10

By repeating the process of Example 2,
17α-ethynyl-17β-(tetrahydropyran-2'-yloxy)-etr-4-en-3-one,
17α-vinyl-17β-(tetrahydropyran-2'-yloxy)-estr-4-en-3-one,
17α-ethynyl-17β-(tetrahydropyran-2'-yloxy)-18-methylandrost-4-en-3-one,
17α-vinyl-17β-(tetrahydropyran2'-yloxy)-18-methylandrost-4-en-3-one,
17α-ethynyl-17β-(tetrahyropyran-2'-yloxy)-18-methylestr-4-en-3-one,
17α-ethynyl-17β-(tetrahydropyran-2'-yloxy)-androst-4-en-3-one and
17α-vinyl-17β-(tetrahydropyran-2'-yloxy)-androst-4-en-3-one were converted into theh corresponding 3β-hydroxy derivatives.

EXAMPLE 11

To a solution of 2 grams of 17α-ethynyl-19-nortestosterone [17α - ethynyl-19-nor-Δ⁴-androsten-17β-ol-3-one] in 50 cc. of benzene there was added 4 cc. of dihydropyran. Next, approximately 10 cc. of the mixture of benzene and dihydropyran was distilled off to remove moisture, and the remaining mixture was then cooled to room temperature. To the cooled mixture there was then added 0.2 gram of p-toluenesulfonic acid, and the resulting reaction mixture was held at room temperature for 12 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 17α-ethynyl-19-nortestosterone (17α - ethynyl-17β-tetrahydropyranyloxy-19-nor-Δ⁴-androsten-3-one).

What is claimed is:
1. A compound of the formula

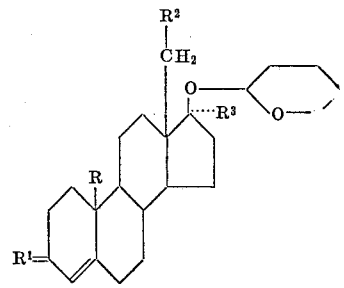

wherein R is selected from the group consisting of hydrogen and methyl; $R^1$ is the group

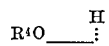

wherein $R^4$ is selected from the group consisting of hydrogen and a carboxylic acyl group containing less than 12 carbon atoms, $R^2$ is a lower alkyl group containing from 1 to 3 carbon atoms; and $R^3$ is selected from the group consisting of lower alkenyl and lower alkynyl.

2. A compound according to claim 1 wherein R is hydrogen, $R^2$ is methyl, $R^3$ is ethynyl and $R^1$ is the group

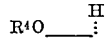

wherein $R^4$ is hydrogen.

3. A compound according to claim 1 wherein R is hydrogen, $R^2$ is methyl, $R^3$ is ethynyl and $R^1$ is the group

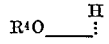

wherein $R^4$ is acetyl.

4. A compound according to claim 1 wherein R and $R^2$ are each methyl, $R^3$ is ethynyl and $R^1$ is the group

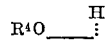

wherein $R^4$ is hydrogen.

5. A compound according to claim 1 wherein R and $R^2$ are each methyl, $R^3$ is ethynyl and $R^1$ is the group

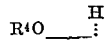

wherein $R^4$ is acetyl.

6. A compound of the formula:

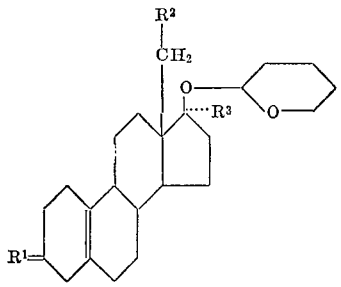

wherein $R^1$ is selected from the group consisting of oxo and the group

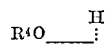

wherein $R^4$ is selected from the group consisting of hydrogen and a carboxylic acyl group containing less than 12 carbon atoms; $R^2$ is a lower alkyl group containing from 1 to 3 carbon atoms; and $R^3$ is selected from the group consisting of lower alkenyl and lower alkynyl.

7. A compound according to claim 6 wherein $R^1$ is oxo, $R^2$ is methyl and $R^3$ is ethynyl.

8. A compound according to claim 6 wherein $R^2$ is methyl, $R^3$ is ethynyl and $R^1$ is the group

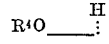

wherein $R^4$ is hydrogen.

9. A compound according to claim 6 wherein $R^3$ is ethynyl, $R^2$ is methyl and $R^1$ is the group

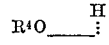

wherein $R^4$ is acetyl.

10. A compound of the formula:

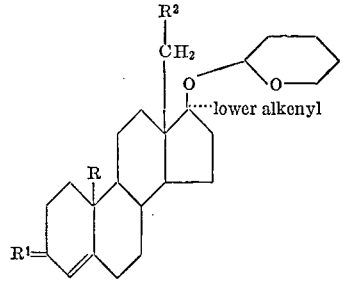

wherein R is selected from the group consisting of hydrogen and methyl; $R^1$ is selected from the group consisting of oxo and the group

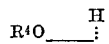

wherein $R^4$ is selected from the group consisting of hydrogen and a carboxylic acyl group containing less than 12 carbon atoms, and $R^2$ is a lower alkyl group containing from 1 to 3 carbon atoms.

References Cited

UNITED STATES PATENTS

| | | | |
|---|---|---|---|
| 3,301,879 | 1/1967 | Wettstein et al. | 260—397.5 |
| 3,167,547 | 1/1965 | Cross | 260—239.55 |
| 3,270,007 | 8/1966 | Alvarez | 260—239.55 |
| 3,300,523 | 1/1967 | Brown et al. | 260—397.4 |
| 3,352,853 | 11/1967 | Klimstra | 260—239.55 |

OTHER REFERENCES

Fried et al. Jour. Amer. Chem. Soc., vol. 83 (1961), p. 4663.

HENRY A. FRENCH, Primary Examiner

U.S. Cl. X.R.

260—397.3, 397.4, 397.5, 999

UNITED STATES PATENT OFFICE
CERTIFICATE OF CORRECTION

Patent No. 3,637,671　　　　　　　　Dated January 25, 1972

Inventor(s) Alexander D. Cross

It is certified that error appears in the above-identified patent and that said Letters Patent are hereby corrected as shown below:

Column 2, line 48, "Altenrative" should be -- Alternative --.
Column 2, formula (II) should appear as follows:

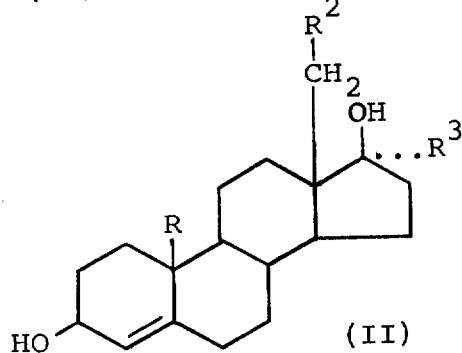

Column 3, formula (III) should appear as follows:

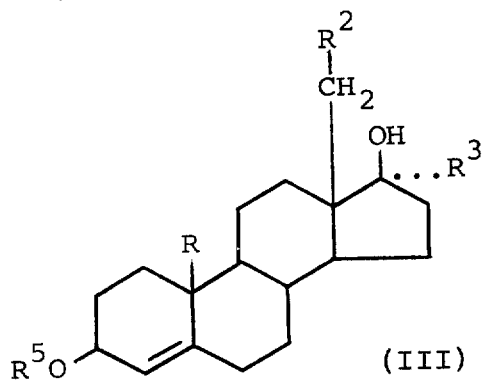

UNITED STATES PATENT OFFICE
CERTIFICATE OF CORRECTION

Patent No. 3,637,671              Dated January 25, 1972

Inventor(s) _____  Page-2-

It is certified that error appears in the above-identified patent and that said Letters Patent are hereby corrected as shown below:

Column 6, line 19, after "en-17-one" delete -- and 3β-hydroxy-18-n-propylandrost-4-en-17-one --.
Column 7, line 19, "furnishings" should be -- furnishing --.
Column 7, line 19, after "17α-vinyl-17β-" and before "18-meth-" insert -- hydroxy --.
Column 8, line 37, "-en-" should be -- -ene- --.
Column 9, line 70, "filtrated" should be -- filtered --.
Column 10, line 5, "17α-vinyl-17β-(tetrahydropyran-$2_2$-yloxy)-" should be -- 17α-vinyl-17β-(tetrahydropyran-2'-yloxy)-$^2$ --.
Column 10, line 25, "-etr-" should be -- -estr- --.
Column 10, line 40, "theh" should be -- the --.

Signed and sealed this 27th day of June 1972.

(SEAL)
Attest:

EDWARD M. FLETCHER, JR.
Attesting Officer

ROBERT GOTTSCHALK
Commissioner of Patents